UNITED STATES PATENT OFFICE.

KARL ELBEL AND JULIUS OPPERMANN, OF BIEBRICH, GERMANY, ASSIGNORS TO KALLE & CO., OF SAME PLACE.

BLACK TRISAZO DYE.

SPECIFICATION forming part of Letters Patent No. 620,574, dated March 7, 1899.

Application filed December 14, 1898. Serial No. 699,262. (No specimens.)

*To all whom it may concern:*

Be it known that we, KARL ELBEL and JULIUS OPPERMANN, doctors of philosophy, subjects to the King of Prussia, Emperor of Germany, residing at Biebrich-on-the-Rhine, Germany, assignors to Kalle & Co., of the same place, have invented a new and useful Improvement in the Manufacture of a new Trisazo Dyestuff, of which the following is a specification.

Our invention relates to the manufacture of a new class of trisazo coloring-matters.

By the action of the chlornitrobenzoic acid

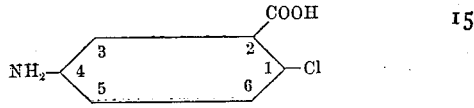

upon para-phenylenediamin a para-amido-para-nitro-diphenylamincarbonic acid is formed, which on reduction yields a para-diamidodiphenylamincarbonic acid having the following formula:

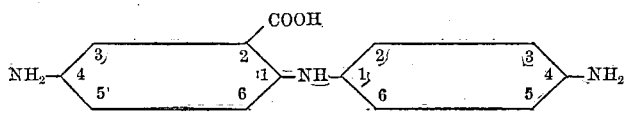

This diamidocarbonic acid is transformed by the action of a nitrite in acid solution into a tetrazo compound, which is easily soluble in water. If this compound is put into reaction with one molecular proportion of an amin suitable for further diazotization—as, for instance, alpha-naphtylamin, 1.6 (or 1.7) naphtylaminsulfo acid or amidonaphtolsulfo acid G.—an intermediate product is obtained, which on diazotization is transformed into an unsymmetrical tetrazo compound of the following general formula:

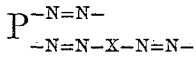

in which formula P represents the para-diamidodiphenylamincarbonic acid and X the radical of the amin suitable for further diazotization. These unsymmetrical tetrazo compounds yield on combination with meta-diamins of the benzene series coloring-matters of high technical value.

The new coloring-matters are dark-colored powders showing a metallic luster, soluble in water, with dark-violet to bluish-black coloration. They dye dark-blue to black shades on unmordanted cotton. The dyeings are distinguished by a degree of fastness unusual with substantive dyestuffs. The fastness is further materially increased by a treatment with metallic salts or with diazo compounds. The new dyestuffs are also suited for dyeing mixed goods (wool and cotton) from neutral or weakly-alkaline baths.

In order to demonstrate the manner in which we carry out our invention, we give the following example: 31.6 kilos hydrochlorate of the diamidodiphenylamincarbonic acid are dissolved in five hundred liters of water. After cooling this solution with ice thirty kilos concentrated hydrochloric acid and an aqueous solution of fourteen kilos sodium nitrite are added to it. As soon as the action of the nitrite is completed the so-obtained tetrazo solution is run into a cold solution of twenty-four kilos amidonaphtolsulfo acid G and thirty kilos sodium carbonate. The intermediate product, the formation of which is soon finished, partly separates out from the solution. Seven kilos sodium nitrite are now added to the alkaline liquid, which is then acidulated by slowly running hydrochloric acid into it. The unsymmetrical tetrazo compound obtained in this manner is suspended in the liquid as a black precipitate. In order to form the coloring-matter, an aqueous solution of twenty-six kilos of meta-toluylendiamin and so much soda ash as is necessary to render the combination liquid alkaline are added. The dyestuff is almost totally precipitated. After some hours' agitation the liquid is heated up. The dyestuff is then salted out, filtered off the mother liquor, pressed, and dried.

The new dyestuff is the sodium salt of an acid having the formula:

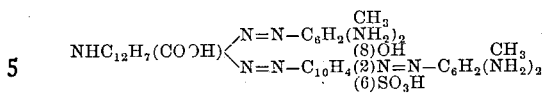

It forms a black powder showing metallic luster, soluble in water, with dark-blue color. It dissolves in concentrated sulfuric acid, with blue color. On addition of water this solution yields a black precipitate.

The new dyestuff is insoluble in cold and difficultly soluble in hot alcohol. It dyes a deep black on unmordanted cotton. The dyeings show great fastness against washing and soaping. By treating the new dye on the fiber with diazo bodies it is transformed into compounds of still greater fastness. When dyed on mixed goods (cotton and wool) from a neutral or weakly-alkaline bath, it also yields a deep black.

Having now described our invention and the manner in which the same is to be performed, what we claim as new, and desire to protect by Letters Patent, is—

1. The process for producing new trisazo dyestuffs by diazotizing the intermediate products formed by combination of tetrazotized diamidodiphenylamincarbonic acid with one molecular proportion of an amin suitable for further diazotization and by combining the so-obtained unsymmetrical tetrazo compounds having the general formula:

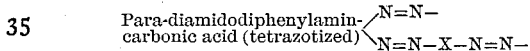

with meta-diamins of the benzene series substantially as hereinbefore described.

2. The process for producing a new trisazo dyestuff by acting with tetrazotized diamidodiphenylamincarbonic acid on one molecular proportion of amidonaphtolsulfo acid G in alkaline solution, by rediazotizing the so-obtained intermediate product and combining the unsymmetrical tetrazo compound formed in this manner having the formula:

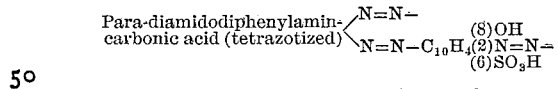

with two molecular proportions of meta-toluylendiamin.

3. As new articles of manufacture the new trisazo dyestuffs which may be formed by combining the unsymmetrical tetrazo compound, obtainable from one molecular proportion of tetrazotized diamidodiphenylamincarbonic acid and one molecular proportion of an amin suitable for further diazotization, with meta-diamins of the benzene series which new dyestuffs have the general formula:

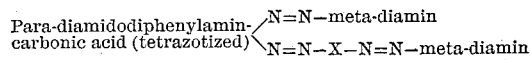

are dark powders showing metallic luster soluble in water with dark-violet to bluish-black color, dyeing dark-blue to black shades on unmordanted cotton or mixed goods (cotton and wool) from neutral or weakly-alkaline baths which shades are rendered faster by subsequent treatments with metallic salts or with diazo compounds.

4. As a new article of manufacture the specific dyestuff obtainable by combining the unsymmetrical tetrazo compound having the formula:

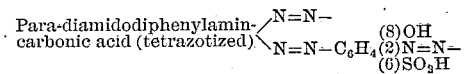

with two molecular proportions of meta-toluylenediamin being an alkaline salt of an acid having the formula:

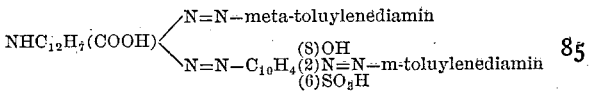

representing in the form of the sodium salt a black powder showing a metallic luster soluble in water with bluish-black color in concentrated sulfuric acid with blue color, which solution yields on addition of water a black precipitate, insoluble in cold difficultly soluble in hot alcohol, dyeing unmordanted cotton or mixed goods (cotton and wool) from a neutral or weakly-alkaline bath a deep black shade of considerable fastness which is still increased by treating the dyeings subsequently with metallic salts or with diazo compounds.

In testimony whereof we have signed our names to this specification in the presence of two subscribing witnesses.

KARL ELBEL.
JULIUS OPPERMANN.

Witnesses:
HEINRICH WISCHLER,
HERM. HOFFSTADTER.